Jan. 20, 1959  J. D. HUTCHISON  2,869,393
VEHICLE ACCELERATOR LINKAGE
Filed Jan. 18, 1957  2 Sheets-Sheet 1

J. D. HUTCHISON
INVENTOR.
E. C. McRae
BY J. L. Faulkner
J. H. Oster
ATTORNEYS

Jan. 20, 1959    J. D. HUTCHISON    2,869,393
VEHICLE ACCELERATOR LINKAGE

Filed Jan. 18, 1957    2 Sheets-Sheet 2

J. D. HUTCHISON
INVENTOR.

BY E.C. McRae
J.R. Faulkner
D.H. Oster

ATTORNEYS

United States Patent Office 2,869,393
Patented Jan. 20, 1959

2,869,393
VEHICLE ACCELERATOR LINKAGE

Joseph D. Hutchison, Allen Park, Mich., assignor to Ford Motor Company, Dearborn, Mich., a corporation of Delaware Application January 18, 1957, Serial No. 635,036

5 Claims. (Cl. 74—516)

This invention relates generally to accelerator linkages for motor vehicles.

An object of the invention is to provide a linkage interconnecting the accelerator pedal of a motor vehicle with the carburetor in such manner as to provide differential carburetor control between low and high speed ranges.

A further object of the invention is to provide a maximum control of high performance engines with a minimum of accelerator pedal travel.

Still another object of the invention is to provide a vehicle accelerator linkage in which the carburetor is opened slowly in the low speed range and is opened more rapidly in the high speed range.

Other objects and advantages of this invention will be made more apparent as this description proceeds, particularly when considered in connection with the accompanying drawings, in which.

Figure 1:
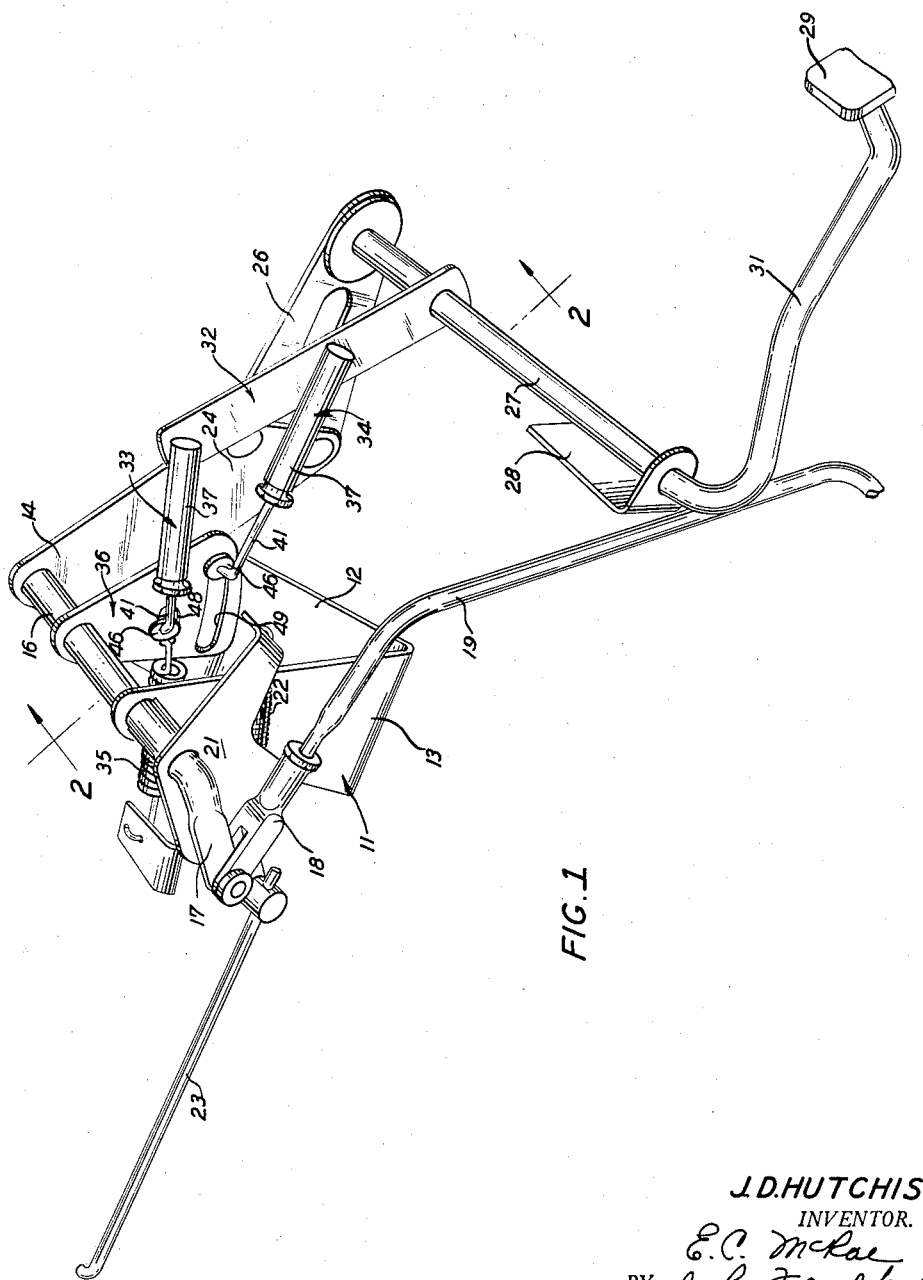
Figure 1 is a perspective view of a vehicle accelerator linkage incorporating the present invention.
Figure 2:
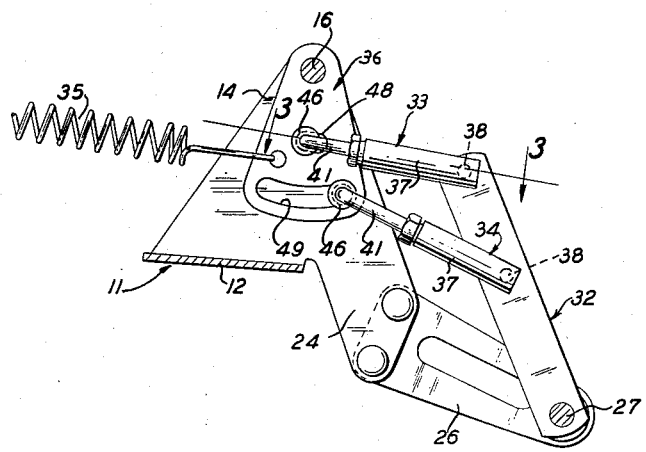
Figure 2 is a vertical cross sectional view taken on the plane indicated by the line 2—2 of Figure 1.
Figure 3:
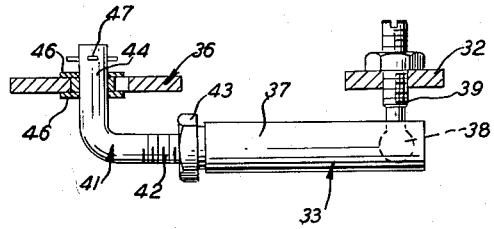
Figure 3 is an enlarged cross sectional view taken on the line 3—3 of Figure 2.

Referring now to the drawings, and particularly to the modification shown in Figures 1 to 3 inclusive, the reference character 11 indicates generally a U-shaped mounting bracket having a base 12 and a pair of upstanding side flanges 13 and 14. A shaft 16 is journaled in the bracket flanges 13 and 14 and is formed at one end with an integral lever portion 17 connected by means of a clevis 18 to a control rod 19 extending to the vehicle automatic transmission (not shown). The shaft 16 also carries a bell crank lever 21 biased by means of a return spring 22 and connected by means of a control rod 23 to the vehicle carburetor (not shown).

The side flange 14 of the mounting bracket 11 is formed with an integral rearward extension 24 which in turn is riveted to a separate rearwardly extending flange 26. An accelerator pedal shaft 27 is journaled in the end of the flange 26 and also in a small L-shaped bracket 28 which may be mounted upon the fire wall of the vehicle body. An accelerator pedal 29 is conventionally connected to the rearward end of the integral rearwardly bent portion 31 of the accelerator pedal shaft 27.

An actuating lever 32 is mounted upon the accelerator pedal shaft 27 and is arranged to be connected by a pair of links 33 and 34 to an actuated lever 36 mounted upon the shaft 16. The lever 36 is biased in a clockwise direction by means of a return spring 35. The links 33 and 34 are substantially identical except for the particular adjustment and reference is made to Figure 3 for a more detailed description.

Each link comprises an internally threaded shell 37 having a socket at one end for receiving the ball shaped end 38 of a stud 39 adjustably mounted upon the actuating link 32. An L-shaped rod 41 has a threaded end 42 received within the shell 37 and clamped in adjusted position by means of a lock nut 43. The opposite end 44 of the rod 41 extends through a slot in the actuated lever 36 and is connected thereto by means of a pair of washers 46 and a cotter pin 47.

Referring now to Figures 1 and 2, it will be seen that the upper link 33 extends through a short slot 48 at an intermediate location in the actuated lever 36 while the lower link 34 extends through an elongated slot 49 located in the lower portion of the lever 36.

The operation of the device is as follows:

It will be noted that in the idling position of the device, as shown in Figure 1, the lower link 34 is at the right hand end of the slot 49 while the upper link 33 is at the left hand end of the slot 48. Consequently, the initial depression of the accelerator pedal 29, which results in a clockwise rotation of the actuating lever 32, will, through the link 34, swing the actuated link 36 in a counter clockwise direction. During the low speed range, the accelerator pedal movement will be transmitted in this manner through the lower link 34. Since the link 34 is connected to the lever 32 at an intermediate location and to the lever 36 at the lower end of the latter, the resulting effective short lever arm on the link 32 and the effective long lever arm on the link 36 causes a relatively slow movement of the link 36 and consequently opens the carburetor slowly through the interconnected bell crank lever 21 and carburetor control rod 23.

As the accelerator pedal is depressed further the upper link 33 moves in the slot 48 in the lever 36 and eventually overtakes the lower link 34 to assume control. At this time it will be noted that the accelerator pedal movement is being transferred to the carburetor control through the upper link 33 while the lower link moves freely within the slot 49 in the lever 36. Due to the location of the connection between the upper link 33 and the levers 32 and 36, the carburetor will be opened more rapidly in this high speed range. This results from the effective long arm utilized in the lever 32 and the relatively short lever arm utilized in the lever 36.

The above described construction provides a differential rate of opening of the carburetor between the low and high speed ranges. It is thus possible to obtain the desirable rate of opening of the carburetor in the low speed range to accomplish proper engine control while at the same time minimizing the overall accelerator pedal travel. In many instances the space requirements may require a limitation in the overall pedal travel, and the construction of the present invention makes it possible to meet such space requirements without effecting the optimum control of modern high performance engines.

The timing of the change-over in the accelerator linkage between high and low speed operation and the degree of differential action provided may be varied as desired by changing the location of the points of connection of the links 33 and 34 to the levers 32 and 36.

Figure 4:
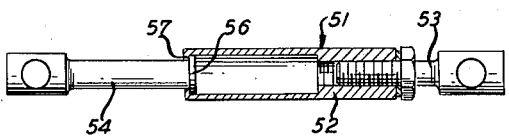
Figure 4 is a cross sectional view of a modified type of link.

Figure 4 illustrates a modification in which the lost motion or over-travel is provided for in the links themselves rather than by providing slots in one of the levers. In this construction the link 51 comprises a central shell 52 adjustably connected to a threaded stud 53 at one end and having a lost motion connection at its opposite end with a short rod 54. The rod 54 is provided with an enlarged end flange 56 slidable within the shell 52 and adapted to engage the shoulder 57 at the end of the shell to limit the extension of the link. Link 51 is pivotally connected at its opposite ends to the actuating and actuated levers and it will be apparent that the construction functions in the same manner as that shown in the principal modification except that the over-travel is taken up within the links themselves rather than between the links and one of the levers.

It will be understood that the invention is not to be limited to the exact construction shown and described, but that various changes and modifications may be made without departing from the spirit and scope of the invention, as defined in the appended claims.

What is claimed is:

1. Accelerator linkage for controlling the carburetor for a motor vehicle from a manually operable pedal, comprising a rotatably mounted actuating shaft operatively connected to said pedal, a rotatably mounted actuated shaft spaced from said actuating shaft and adapted to be operatively connected to said carburetor, an actuating lever mounted upon said actuating shaft, an actuated lever mounted upon said actuated shaft, a first link interconnecting said levers and incorporating a lost motion connection in said interconnection, a second link interconnecting said levers and also incorporating therein a lost motion connection, said second link being connected to said actuating lever at a point spaced farther from the actuating shaft than the connection between said first link and said actuating lever, and said second link being connected to said actuated lever at a point spaced nearer said actuated shaft than the point of connection between said first link and said actuated lever.

2. The structure defined by claim 1 which is further characterized in that said lost motion connections comprise elongated slots formed in one of said levers and slidably receiving the adjacent ends of said links.

3. The structure defined by claim 1 which is further characterized in that said lost motion connections comprise extensible links interconnecting said levers, said links each having a pair of telescopic elements, and said telescopic elements having interengaging means limiting telescopic movement in one direction.

4. Mechanism for actuating the carburetor of a motor vehicle engine by means of a manually operable foot pedal, comprising a mounting bracket, a shaft pivotally mounted upon said mounting bracket and adapted to be operatively connected to said carburetor, a second shaft extending generally parallel of said first shaft and operatively connected to said foot pedal, a pair of levers mounted respectively upon said first and second shafts and extending generally parallel to each other, and a pair of links interconnecting said levers and connected to said levers at points spaced different distances from the shafts upon which said levers are mounted, each of said links having a pin and slot lost motion connection with one of said levers.

5. The structure defined by claim 4 is further characterized in that said lost motion connections comprise a pair of slots in one of said levers slidably receiving the adjacent ends of said pair of links, the adjacent end of one of said links in the released position of the foot pedal being at one end of the associated slot in the lever and the adjacent end of the other of said links being at the opposite end of the other slot in said lever.

References Cited in the file of this patent

UNITED STATES PATENTS

| | | |
|---|---|---|
| 2,211,438 | Schnell | Aug. 13, 1940 |
| 2,706,020 | Freers et al. | Apr. 12, 1955 |
| 2,755,891 | Levell et al. | July 24, 1956 |